(12) United States Patent
Chou

(10) Patent No.: US 9,046,629 B2
(45) Date of Patent: Jun. 2, 2015

(54) FRAME AND BACKLIGHT MODULE HAVING SAME

(71) Applicant: HON HAI PRECISION INDUSTRY CO., LTD., New Taipei (TW)

(72) Inventor: Yun-Yu Chou, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/951,573

(22) Filed: Jul. 26, 2013

(65) Prior Publication Data

US 2014/0340937 A1      Nov. 20, 2014

(30) Foreign Application Priority Data

May 15, 2013    (TW) .............................. 102117290 U

(51) Int. Cl.
*F21V 8/00*    (2006.01)

(52) U.S. Cl.
CPC .................................... *G02B 6/0033* (2013.01)

(58) Field of Classification Search
USPC ...................... 362/612, 632–634; 349/65–68
See application file for complete search history.

(56) References Cited

U.S. PATENT DOCUMENTS 7,223,009 B2 *    5/2007    Henriet et al. ................. 362/617
7,802,913 B2 *    9/2010    Tsai .............................. 362/632

* cited by examiner

*Primary Examiner* — Anabel Ton
(74) *Attorney, Agent, or Firm* — Novak Druce Connolly Bove + Quigg LLP

(57) ABSTRACT

A frame for a backlight module includes a first strip, a second strip, a third strip, and a fourth strip connected end to end in sequence to cooperatively enclose an interior of the frame. The first strip, the second strip, the third strip, and the fourth strip each include an inner surface facing the interior of the frame. A number of microdots are formed on the inner surface.

11 Claims, 4 Drawing Sheets

FRAME AND BACKLIGHT MODULE HAVING SAME

BACKGROUND

1. Technical Field

The present disclosure relates to a backlight module and a frame used in the backlight module.

2. Description of Related Art

A backlight module includes a frame and a light guide plate received in the frame. The light guide plate includes side surfaces facing the frame. Light emitting from the side surfaces are transmitted to the frame and are partly absorbed by the frame. Thus, the light emission efficiency of the backlight module is reduced.

Therefore, it is desirable to provide a backlight module and a frame that can overcome the limitations described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
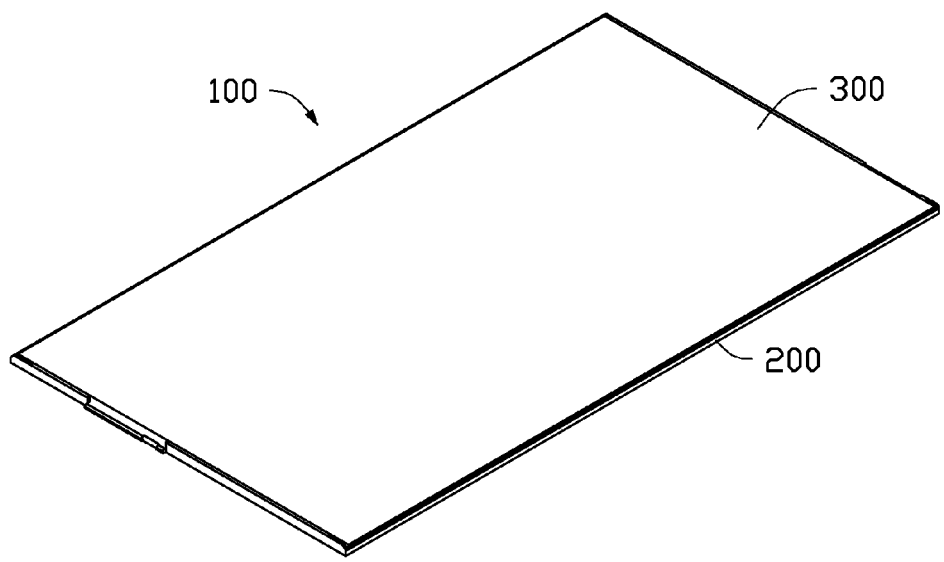
FIG. 1 is a schematic, isometric view of a backlight module according to an exemplary embodiment of the present disclosure. The backlight module includes a frame.
Figure 2:
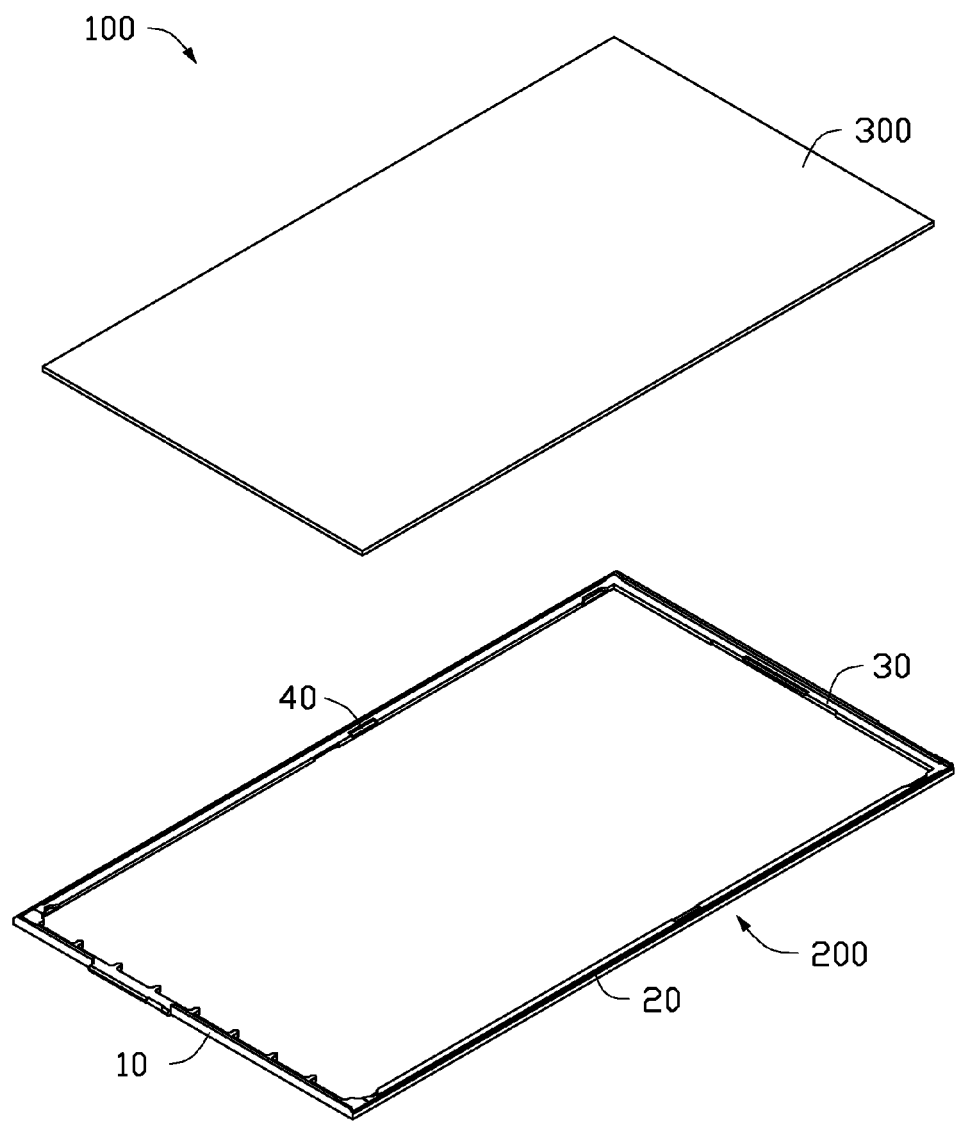
FIG. 2 is an exploded view of the backlight module of FIG. 1.

FIGS. 1 and 2 show a backlight module 100 according to an exemplary embodiment. The backlight module 100 includes a frame 200 and a light guide plate 300 received in the frame 200. The backlight module 100 further includes a light source, a reflective plate, and a diffusion plate received in the frame 200 (not shown).

The frame 200 includes a first strip 10, a second strip 20, a third strip 30, and a fourth strip 40. The first strip 10, the second strip 20, the third strip 30, and the fourth strip 40 are connected end to end in sequence to cooperatively enclose an interior of the frame 200. The first strip 10 is parallel to the third strip 30. The second strip 20 is parallel to the fourth strip 40. The first strip 10 and the third strip 30 are perpendicular to the second strip 20 and the fourth strip 40.

In this embodiment, the frame 100 is made of plastic. The first strip 10, the second strip 20, the third strip 30, and the fourth strip 40 are integrally formed.

Figure 3:
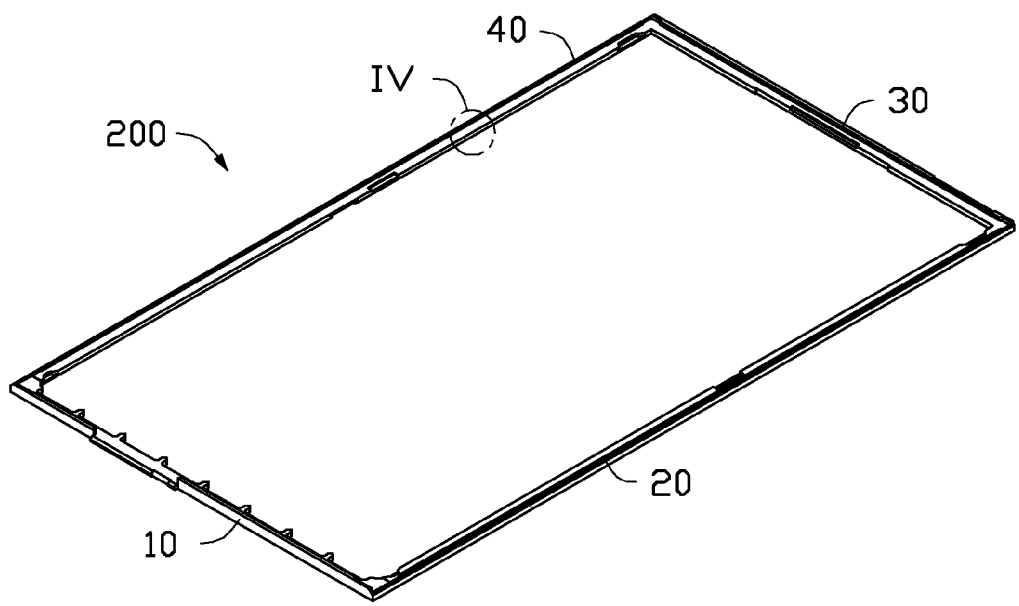
FIG. 3 is a schematic, isometric view of the frame of FIG. 1.
Figure 4:
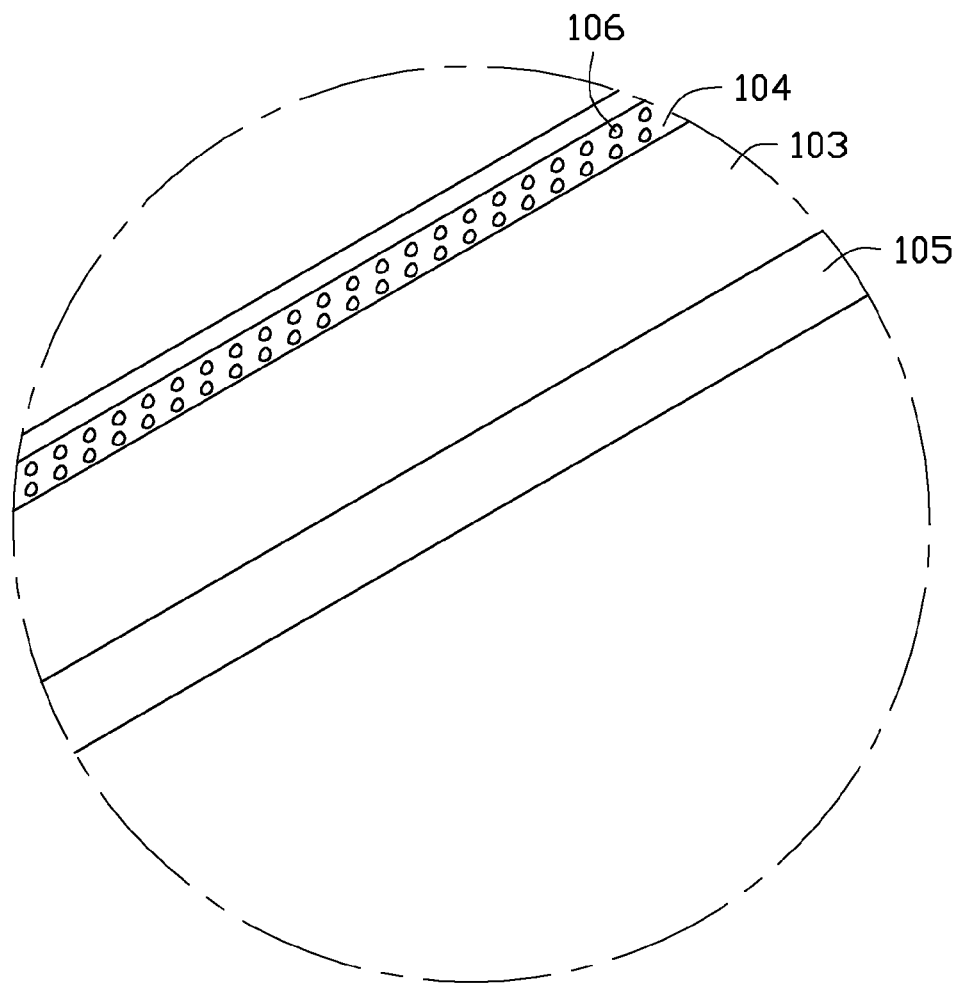
FIG. 4 is an enlarged view of part IV of FIG. 3.

Referring also to FIGS. 3 and 4, the first strip 10, the second strip 20, the third strip 30, and the fourth strip 40 each include a first inner surface 104, a second inner surface 105, and a stepped surface 103. The first inner surface 104 and the second inner surface 105 face the interior of the frame 200. The first inner surface 104 is parallel to the second inner surface 105. The stepped surface 103 is formed between the first inner surface 104 and the second inner surface 105 and is perpendicular to the first inner surface 104 and the second inner surface 105. A number of microdots 106 is formed on the first inner surface 104. In this embodiment, the microdots 106 are dome-shaped protrusions and are evenly distributed on the first inner surface 104.

The light guide plate 300 is received in the frame 200 and is supported by the stepped surface 103. The first inner surface 104 faces peripheral surfaces of the light guide plate 300. Light emitting from the peripheral surfaces of the light guide plate 300 is reflected back to the light guide plate 300 by the first inner surface 104.

The microdots 106 increase the surface area of the first inner surface 104. Compared to frames without the microdots 106, more area of the first inner surface 104 can reflect light, and the reflectivity of the first inner surface 104 is increased. In this way, more light can be reflected by the first inner surface 104, and the loss of light from the peripheral surfaces of the light guide plate 300 is reduced.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A frame for a backlight module, the frame comprising:
a first strip, a second strip, a third strip and a fourth strip connected end to end in sequence to cooperatively enclose an interior of the frame, the first strip, the second strip, the third strip and the fourth strip each comprising a first inner surface facing the interior of the frame; and
a plurality of microdots formed on the first inner surface; wherein
the first strip is parallel to the third strip, the second strip is parallel to the fourth strip and is perpendicular to the first strip and the third strip.

2. The frame of claim 1, wherein the frame is made of plastic.

3. The frame of claim 1, wherein the first strip, the second strip, the third strip and the fourth strip are integrally formed.

4. The frame of claim 1, wherein the first strip, the second strip, the third strip, and the fourth strip each comprise a second inner surface and a stepped surface, the second inner surface is parallel to the first inner surface, the stepped surface is positioned between the first inner surface and the second inner surface.

5. The frame of claim 1, wherein the microdots are dome-shaped.

6. A backlight module comprising:
a frame comprising:
a first strip, a second strip, a third strip and a fourth strip connected end to end in sequence to cooperatively enclose an interior of the frame, the first strip, the second strip, the third strip and the fourth strip each comprising a first inner surface facing the interior of the frame; and
a plurality of microdots formed on the first inner surface; and
a light guide plate received in the frame and surrounded by the first strip, the second strip, the third strip and the fourth strip, peripheral surfaces of the light guide plate facing the first inner surface.

7. The backlight module of claim 6, wherein the first strip is parallel to the third strip, the second strip is parallel to the fourth strip and is perpendicular to the first strip and the third strip.

8. The backlight module of claim 6, wherein the frame is made of plastic.

9. The backlight module of claim 6, wherein the first strip, the second strip, the third strip and the fourth strip are integrally formed.

10. The backlight module of claim 6, wherein the first strip, the second strip, the third strip, and the fourth strip comprise a second inner surface and a stepped surface, the second inner surface is parallel to the first inner surface, the stepped surface is positioned between the first inner surface and the second inner surface, and the stepped surface supports the light guide plate.

11. The backlight module of claim 6, wherein the microdots are dome-shaped.

* * * * *